Figure 1:
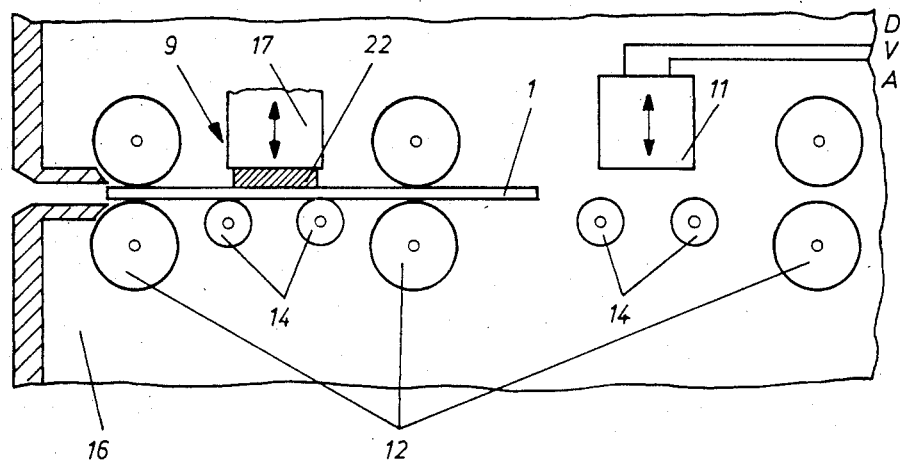

United States Patent [19]

Obrecht

[11] Patent Number: 4,605,896
[45] Date of Patent: Aug. 12, 1986

[54] METHOD OF CONTACTING THE GALVANIC CONTACTS OF AN IDENTIFICATION CARD WITH AN EMBEDDED IC-MODULE

[75] Inventor: Werner Obrecht, Wielenbach, Fed. Rep. of Germany

[73] Assignee: GAO Gesellschaft für Automation und Organisation mbH, Fed. Rep. of Germany

[21] Appl. No.: 710,944

[22] Filed: Mar. 13, 1985

Related U.S. Application Data

[63] Continuation of Ser. No. 261,548, May 7, 1981, abandoned.

[30] Foreign Application Priority Data

May 20, 1980 [DE] Fed. Rep. of Germany ....... 3019206

[51] Int. Cl.[4] ........................ G01R 1/06; G01R 31/02; G07F 1/06; G06K 7/01
[52] U.S. Cl. ................................ 324/158 F; 194/205; 235/438; 324/158 P; 339/95 A; 339/114
[58] Field of Search ............... 324/158 F, 158 P, 72.5; 235/441, 443, 438; 371/22; 194/4 C, 6, 4 R, 4 E, 4 G; 339/95 R, 95 A, 114, 115 R; 15/1; 134/1, 6

[56] References Cited

U.S. PATENT DOCUMENTS

1,984,540 12/1934 Nelson ............................... 339/95 A
4,404,464 9/1983 Moreno ............................... 235/438

FOREIGN PATENT DOCUMENTS

2659573 7/1977 Fed. Rep. of Germany .
53-37077 4/1978 Japan ............................... 324/158 P
WO79/00543 8/1979 PCT Int'l Appl. .
409047 9/1966 Switzerland ..................... 339/95 R
30313 of 1911 United Kingdom .............. 339/95 R Primary Examiner—Ernest F. Karlsen
Attorney, Agent, or Firm—Andrus, Sceales, Starke & Sawall

[57] ABSTRACT

A method of cleaning contact surfaces in connection with integrated circuits embedded in identification cards. The cleaning is carried out during insertion of the card or in the testing position of the card by means of special cleaning devices or the contact elements themselves.

The cleaning can be triggered or regulated as a function of the testing of the operability of the contacts.

9 Claims, 10 Drawing Figures

METHOD OF CONTACTING THE GALVANIC CONTACTS OF AN IDENTIFICATION CARD WITH AN EMBEDDED IC-MODULE

This is a continuation of co-pending application Ser. No. 261,548, filed on May 7, 1981, now abandoned.

SPECIFIC DESCRIPTION

The invention concerns a method of contacting the galvanic contacts of IC-modules or other electronic components embedded in identification cards or similar data carriers.

Identification cards with an integrated circuit (IC) have been known for some time. The data exchange between the IC and a test apparatus is usually carried out via conductive coverings on the identification card, i.e. galvanically.

However, this simplest way of contacting involves the problem of contact contamination. This is especially the case with identification cards and similar data carriers which are inevitably exposed to a large number of environmental influences. Contaminated contacts either prevent all communication, which results in the rejection of the card, or else they cause uncertain operational conditions, because they may temporarily interrupt the data transfer or change logical levels in such a way that their recognition by the receiver becomes uncertain.

In order to ensure reliable operational conditions it is thus known from the DE-OS 26 59 573 for the constitution of the contacts to be checked before the communication phase. For this purpose each contact lead, including the contact surface, is designed doubly. For testing, two probes connected to a voltage source are guided onto a pair of contacts. If the contact surfaces are clean the short-circuit current which then flows reaches a certain threshold indicating that the card can be used under reliable operational conditions.

As the threshold is set high as an indicator for the reliable operation of the card, this procedure leads to a high rejection rate.

The object of the invention is to provide a method of testing IC-identification cards with galvanic contact pick-up which allows for a very low rejection rate while simultaneously guaranteeing defined operational conditions.

According to the invention the object is achieved by cleaning the identification card contacts before or during contacting by means of separate cleaning elements or specially designed contact elements.

The simplest way of doing this is to clean the contact area while the card is going into the test apparatus. The known cleaning equipment which is mounted immobilely on the card transport path before or directly at the contact pick-up head, or mounted so that it can be moved out of the transport path, can be used for this purpose.

An advantageous development of the invention consists in combined cleaning and contact equipment. This allows for the cleaning process to be made contingent on the degree of contamination of the contact surfaces in order to preserve the contact surfaces.

By aid of the method according to the invention it is thus possible to create reliable operational conditions for data exchange between the IC-card and the test apparatus with a very low rejection rate. Advantageous developments of the invention are the subject of the sub-claims.

In the following, forms of execution of the invention are described by way of example with reference to the adjoined drawings.

Figure 2:
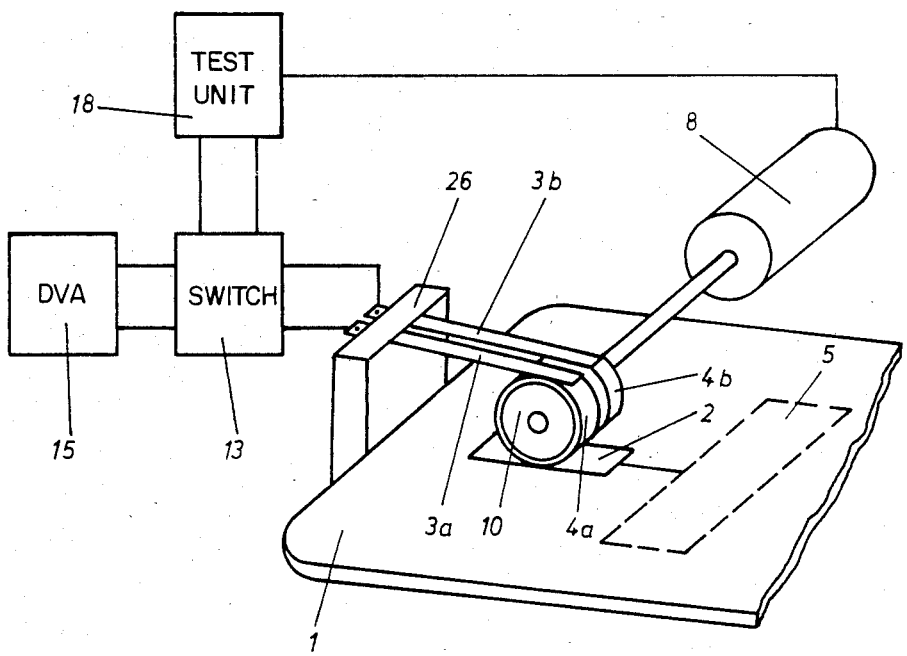
Figure 3A:
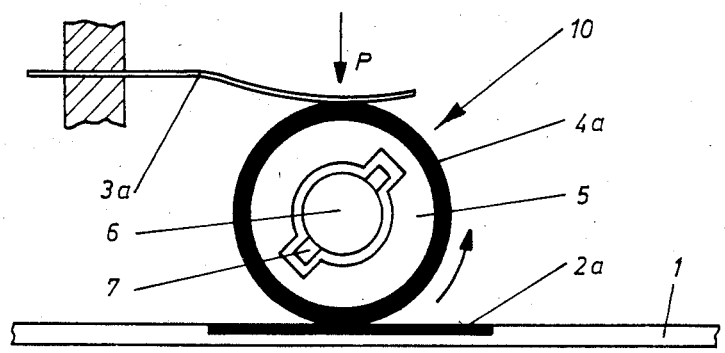
Figure 3B:
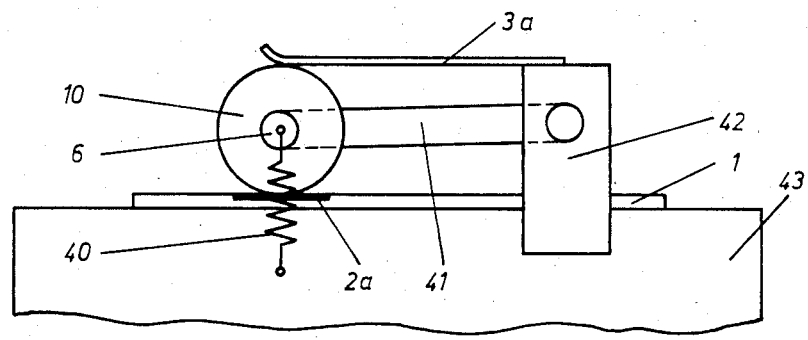
Figure 4:
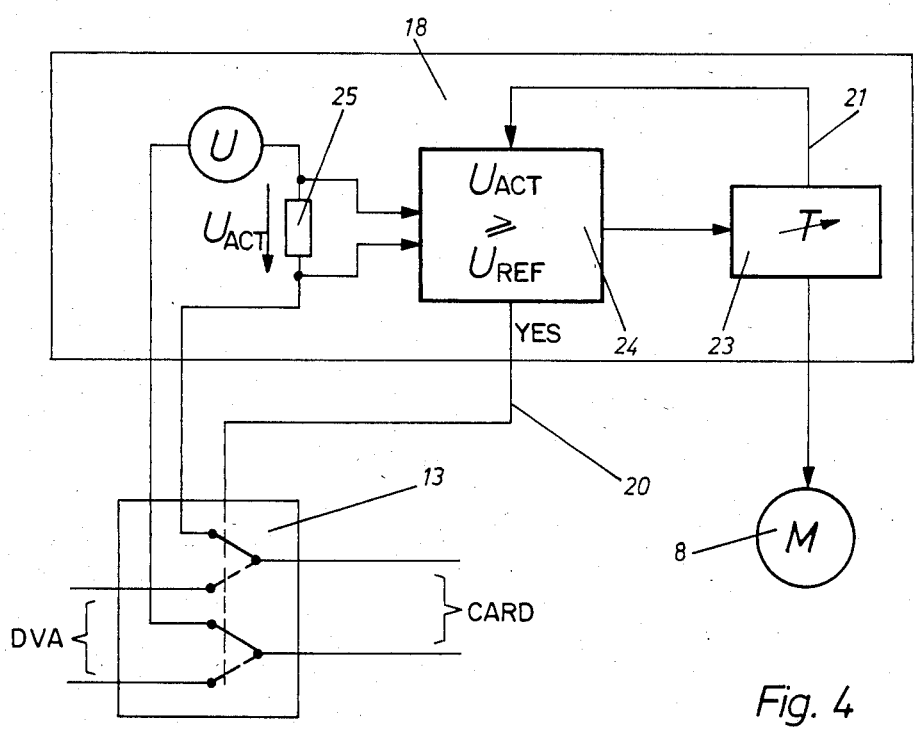
Figure 5:
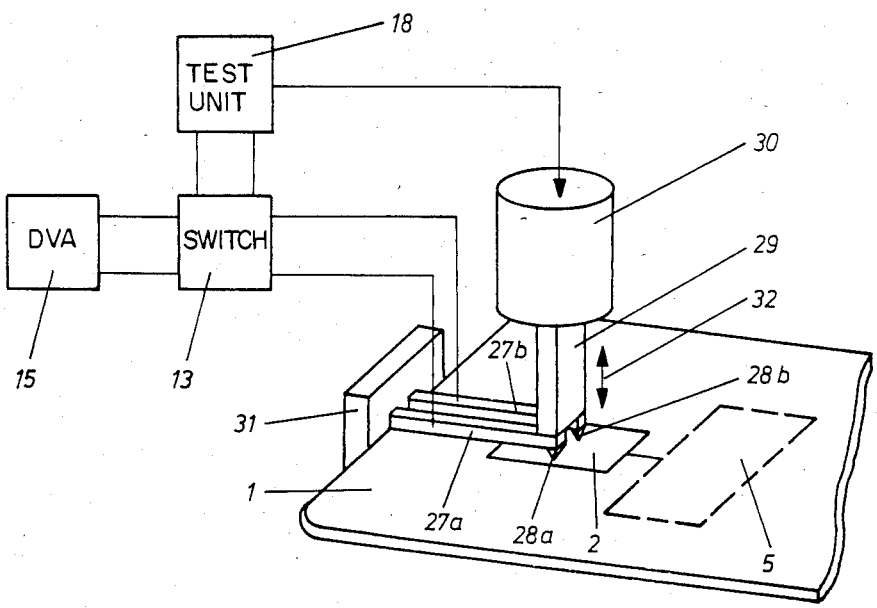
Figure 6:
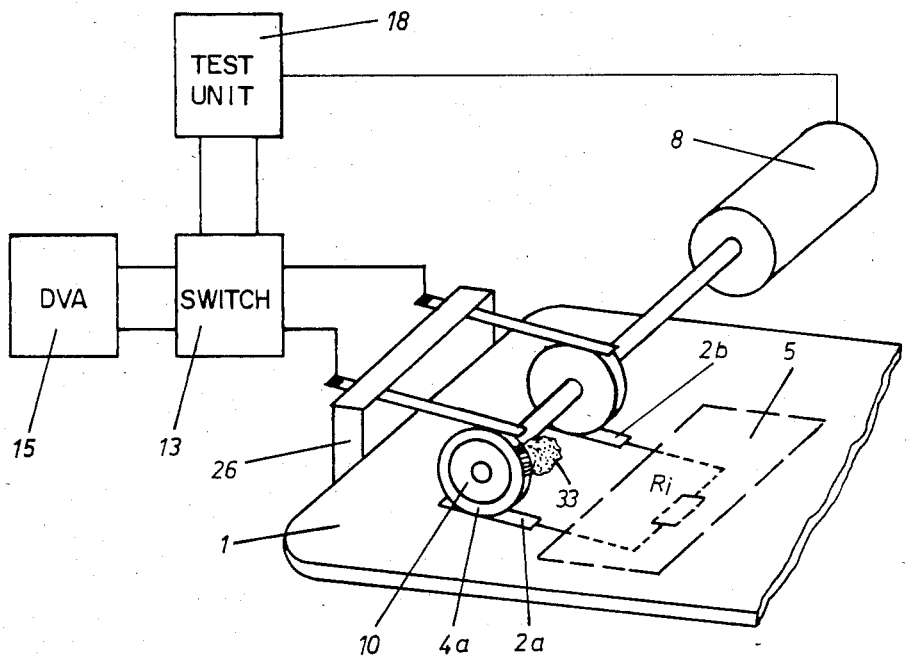
Figure 7:
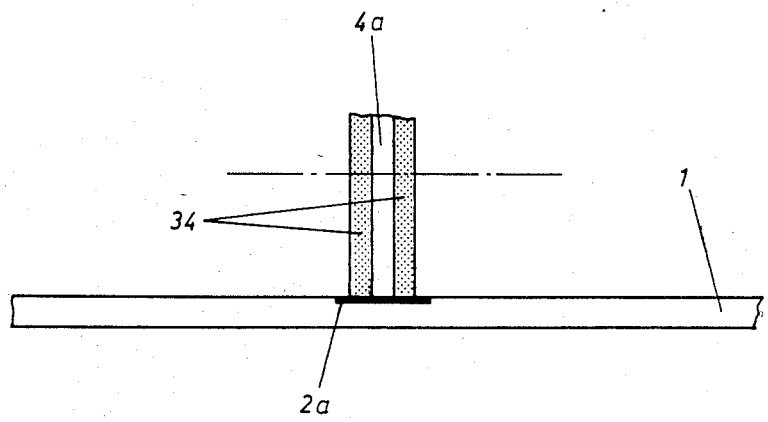
Figure 8:
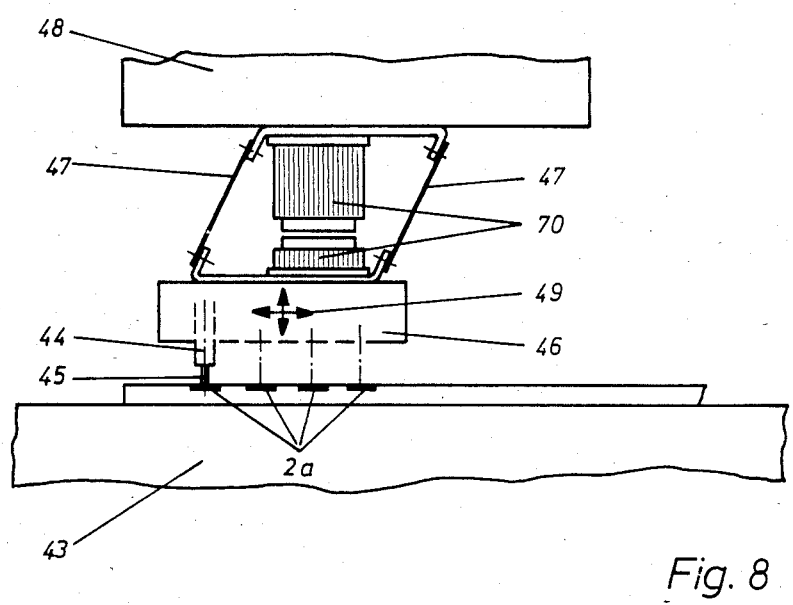
Figure 9:
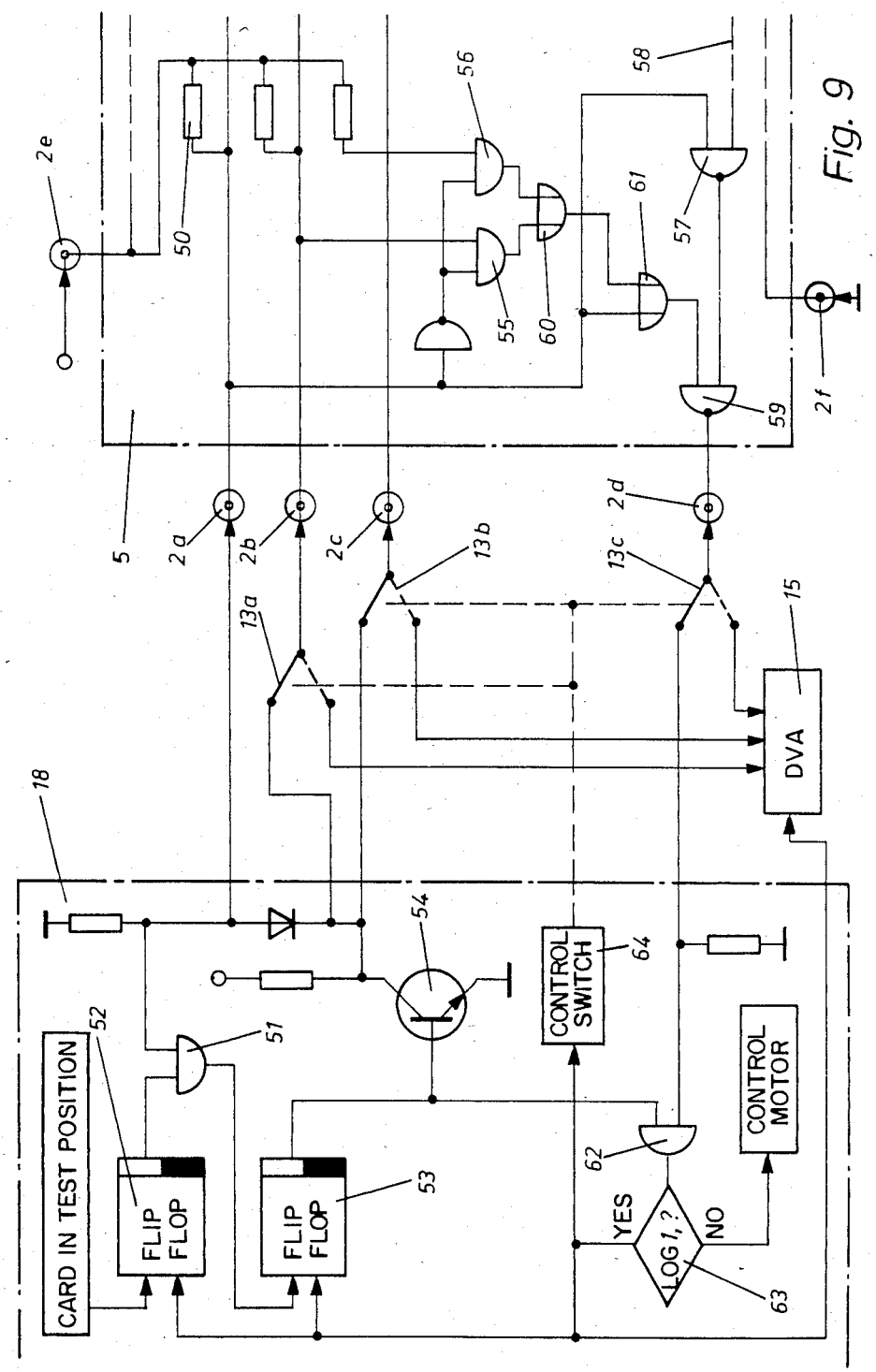

FIG. 1 shows the schematized section of a form of execution of a device for carrying out the method according to the invention, FIG. 2 shows a form of execution of the invention in which the contact head is used simultaneously as cleaning equipment, FIG. 3a shows the design of a rotating body as a cleaning element, test and measuring electrode, FIG. 3b shows an alternative form of execution of the arrangement shown in FIG. 3a, FIG. 4 shows a circuit for carrying out the testing and regulation of the cleaning elements, FIG. 5 shows a form of execution of a device with rammers which are supported by contact tips on the contact surface, FIG. 6 shows a device for testing the contact resistance between two different contacts with an evaluating circuit, FIG. 7 shows another form of execution of the cleaning element designed as a rotating body, FIG. 8 shows another form of execution of combined contact and cleaning equipment, and FIG. 9 shows a circuit arrangement for carrying out the testing and regulation of the cleaning elements, whereby testing is carried out by a so-called pretest of the integrated circuit.

As in FIG. 1 the identification card 1 is pulled into the apparatus 16 by means of a transport system 12. Before it reaches the contact head 11 which makes the electric connection with a data-processing machine (DVA), it goes through cleaning equipment. This can be designed, for example, as a brush, a sponge soaked in cleaning fluid or else a rotating element. Accordingly, the cleaning may be carried out in a dry or a wet process.

The figure shows a brush 22 attached to a stamp 17, which brush can be directed onto the identification card 1 with light pressure, as required. The rolls 14 serve as support for this process. The cleaning equipment can also be arranged immobilely, that is, so that it cannot be moved away from the transport path of the identification card.

In the form of execution described, the identification card is to be returned to the card owner if a sufficient galvanic contact is not established by the contacting unit 11. When the cleaning equipment is arranged immobilely the identification card contacts go through two more cleaning phases when it is returned and inserted again, so that the contact cleaning takes place three times altogether when the card is inserted twice. If required, this multiple insertion or multiple cleaning can be repeated by the card owner as often as he chooses.

If a wet process is used as the cleaning process, it may be useful to provide a drying device in the form of a rubber stripping lip in front of the cleaning station 17 (as seen when one is at the insertion slit), which lip removes the remaining cleaning fluid, if any, in the manner of a windshield wiper. A drying felt or some such thing can also fulfill this function.

To preserve the identification card the cleaning can also be carried out by means of a cleaning device which can be removed from the transport path of the identification card. The contact cleaning of the identification card can thus be activated, for example, only by insertion of the card. It is also feasible, however, to switch on the cleaning process only in the case of really contaminated contacts when the card is being returned, instead of cleaning the contacts as above when the card is inserted. In this case the operator would be asked to insert the identification card again (without any further steps) by means of corresponding indicators, or the identification card would be fed automatically back to the contacting unit after passing through the cleaning device, if necessary several times. According mixed forms are also feasible, i.e. cleaning on the way to the insertion slit after negative contact testing and during the subsequent transport back to the contact equipment.

FIG. 2 shows a form of execution of the invention in which the contact head is used simultaneously as cleaning equipment, as required. The identification card 1 bears an integrated circuit 5 connected to contact surfaces 2 on the surface of the card, of which only one is depicted for the sake of clarity. The contact head in this example of execution consists of two rotating bodies 10 which are insulated against each other. The conduction path goes from the contact rings 4a, 4b of the rotating bodies via the pick-ups 3a, 3b to a switch 13. The pick-ups 3a, 3b are attached to the fixture 26. The switch first connects the contact rings resting on a common contact with a test unit 18 in which the contact resistance is compared with a given nominal value or threshold, as described below. If the resistance is within the given limits, the switch opens the conduction path to the DVA 15. If the contact resistance is greater than a given value, the motor 8 is triggered which rotates the contact rings 4a, 4b on the contact surface until the contact resistance necessary for reliable operation of the identification card is reached. The maximal time period for a cleaning phase is limited, of course, as it can be assumed after a certain cleaning period that the contact surfaces are too contaminated to be cleaned by the apparatus. The card is then rejected.

In the combined form of execution shown in FIG. 2, the cleaning of the contacts can take place parallel to the contact testing, so that as soon as good contact pick-up is ensured, the cleaning can be interrupted. It is also possible, however, to arrange for cleaning intervals with contact testing after each one. It is generally sufficient to trigger the motor 8 just for 1 or 2 rotations. If the necessary contact resistance is not reached by this time, the motor is triggered again, if required.

In any case the cleaning activity and thus the wear on the contacts is kept to a minimum—regulated by the degree of contamination.

FIG. 3a shows the detailed execution of a rotation body 10 consisting of a conductive contact ring 4a and an insulator 5. The contact ring 4a is pressed against the contact surface 2a of the identification card 1 with the pick-up 3a designed as a spring. The axis 6 with the drive pins is connected with the motor shown in FIG. 2. The bearing play between the axis 6 and the insulator 5 must be big enough for tolerances that may occur to be compensated and the tension P of the spring 3a to become operative on the contact surface.

FIG. 3b shows a rotating body 10 of which the axis 6 insulated against the rotating body is connected to the support 43 by a spring 40, so that the rotating body is pressed against the contact surface 2a. Several rotating bodies can be attached to a common axis 6 which can be connected to a motor by a flexible shaft, if necessary, as shown in FIG. 2. The axis 6 is connected with an appropriate linkage 41 which is pivoted in the support 42.

FIG. 4 shows in detail the units 13 and 18, switch and test unit of FIG. 2. The switch connects the contact surfaces with the test unit 18 at the beginning of the test. The actual voltage $U_{act}$ declining at the resistance 25 is proportional to the contact resistance. If the voltage is greater or equal to a given required voltage $U_{ref}$, the switch is switched to the DVA 15 via the conduction path 20. In the other case a timer 23 is triggered which turns on the motor 8 for a predetermined time. When the time is over another voltage comparison is carried out via line 21 in the comparator 24. It is also possible, of course, to let the motor run until the necessary contact resistance is reached.

Another form of execution of the invention is shown in FIG. 5. In contrast to FIG. 2 the contact elements are replaced here by stationary contact fingers 27a, 27b, which are provided with contact tips 28a, 28b resting on the contact surface 2. The contact fingers are attached elastically to the support 31 so that the contact tips can be pressed against the contact surface 2 by aid of a rammer 29. The lifting movement of the rammer in accordance with the depicted arrow 32 can be attained with an appropriate device 30. Electrodynamic, electromagnetic or else pneumatic systems are suited as energy converters for this purpose.

At the beginning of the card testing the contact tips 28a, 28b are pressed onto the contact surface 2 with a predetermined initial pressure. If the contact resistance does not reach the desired value, the contact pressure is increased by aid of the regulating circuit already described. If a maximally permissible contact pressure is exceeded the card is rejected. The contact tips can also be replaced by needles. Thus the contact necessary for reliable functioning of the arrangement is also attained in the case of extremely stubborn layers of dirt.

Contact resistances are tested with the arrangements discussed in FIGS. 2 and 5. Shunt resistances which are present between adjacent contact surfaces are not taken into consideration by the procedures mentioned. According to the type of circuit technology of the IC employed, shunt resistances in certain value ranges can also disturb the operational reliability of the switching circuit when the environmental conditions are extremely bad. At the worst, two inputs of a circuit arrangement are shorted. An arrangement which takes the shunt resistances into consideration is shown in FIG. 6. In this arrangement a rotating body 10 is placed on each contact surface 2a, 2b. If the identification card is in order, the internal resistance Ri of the circuit arrangement between the contact surfaces is determined and filed in the test unit as a comparative value. It is then assumed that the contact resistance is negligibly small and the shunt resistance is negligibly great. If in the following tests the value of the measured internal resistance does not correspond to the comparative value, because it is increased, for example, by contact resistances or decreased by a shunt resistance, the test unit initiates a cleaning process, as described above.

The cleaning of the card surface between the contact areas can be carried out, for example, by aid of a circular brush 33 (represented by a dotted line in the fig.) attached between the rotating bodies 10. It is also possible to clean the card surface during the card insertion, as described for FIG. 1. A further possibility is shown in FIG. 7. The rotating body resting on the contact surface has a conductive coating 4a only in the middle area. On both sides of the conductive coating there are brush-like elements 34 which interrupt the shunt between two contact surfaces, if any, by a rotating movement.

FIG. 8 shows a cleaning and contact device, in which the contact pick-up is carried out by aid of connector pins 44. Contact tips 45 are attached elastically in the connector pins 44, which pins are attached together in a block 46, in order to ensure the necessary bearing pressure on the contact surfaces 2a. The block 46 can be swung, if necessary, by aid of two flat springs 47 attached to the support 48. The arrangement can then be set swinging, as required, by appropriate activation of an electromagnetic device 48 in such a way that the block 46 carries out movements as shown by the depicted arrows 49 with its contact tips, and the contact surfaces 2a are cleaned in this way.

The testing of whether the constitution of the card surface and in particular of the contact surfaces allow for an orderly operation, can also be performed essentially by the integrated circuit itself. The circuit must respond to certain input information with certain output information when the card and contact surfaces are in a clean state.

Thus at least part of the testing electronics of the test device can be relegated to the IC of the identification card. The testing devices are therefore much simpler and thus cheaper to construct. Furthermore, the testing can be carried out differently according to the type of card, depending to what lengths one wishes to go. As the identification card is produced in millions, the additional switching for the identification card IC is of no consequence. Furthermore, changes in the testing program can be taken into consideration anew for each generation of identification card without any modifications of the testing device with this type of testing regulated by the electronics of the identification card.

To explain the latter testing procedure, FIG. 9 shows an integrated circuit 5 with contact surfaces 2a to 2f. The electronic components necessary for the test routine are also shown. The circuit itself, to which the interconnections shown by dotted lines lead, is not depicted in the figure. For the sake of clarity the number of contact surfaces is reduced to a minimum. Along with contact surfaces 2e and 2f these are for the current supply and the ground connection, the contact surfaces 2a are for hooking up a test line, the contact surfaces 2b and 2c are for the input lines and the contact surface 2d is for the output line of the integrated circuit. During the test routine the input lines hooked up to the contact surfaces 2a, 2b and 2c are set at log. 0. If a log. 1 level can then be picked up on the contact surface 2d, it is ensured that all contact surfaces (including supply and ground) are processing the applied signals perfectly accurately. When the log. 1 level is recognized the test routine is cut short and the circuit is connected with the DVA by triggering the switches 13a, 13b and 13c. If a log. 0 level appears at the output (contact 2d) a motor 8 is triggered to clean the contact surfaces, as shown, for example, in FIG. 4. The cleaning can be carried out at predetermined intervals or else continually.

For reliable operation of the arrangement it is necessary that the contact surface 2a is in an orderly state for the test signal. Thus the contact surface 2a is tested before the test routine itself. The contact surface 2a is connected with the supply voltage by a resistance 50 within the switching circuit 5, so that if the contact is clean a log. 1 level reaches the gate 51 of the test unit 18. A flip-flop signal 52 is also directed to the gate 51, which signal converts to the log. 1 state as soon as the identification card is in testing position. If the contact surface 2a is in an orderly state, a second flip-flop signal 53 is set. This results in a transistor 54 being triggered which sets the connecting lines of the contact surfaces 2a, 2b and 2c at log 0. The log. 0 level of the test line connected to the contact surface 2a causes the gates 55 and 56 within the circuit 5 to be opened for the control lines also leading to the gates. The gate 57 is blocked so that the state of the output line 58 of the circuit itself cannot influence the test routine. The log. 1 level of the gate 57 opens the following gate 59 for the control line also leading to the gate. If the contact surfaces 2b, 2c are in a perfect state, a log. 0 level appears at the output of the OR-gate 60. The level is transferred via the OR-gate 61 to the gate 59. At the output of the gate there is thus a log. 1 level. If one of the contacts 2a, 2b or 2c is not in order, a log. 0 level appears at the output of the gate 59. The same is true if the current supply is interrupted, for example. The level of the contact surface 2d is transferred to the gate 62 of the test unit 18 and reaches the decision circuit during the test routine. If the decision circuit recognizes a log. 1 level, the switches 13a, 13b and 13c are triggered by an appropriate unit 64, the DVA 15 receives a start-signal and the flip-flops 52 and 53 are reset. The latter results in the gates 55 and 56 being blocked in order for the input information of the DVA 15 to be directed to the actual switching circuit of the arrangement 5 (not shown in the fig.) without disturbance. Furthermore, the output gate 57 is opened so that the output information of the circuit itself can reach the DVA 15 via the interconnection 58.

If the contact surface 2a of the test line is not in an orderly state the flip-flop 53 is not triggered and thus the gate 62 is not opened. The decision circuit 63 recognizes a log. 0 level at the time of interrogation, at which point the motor 8 is triggered.

The start signal for the interrogation in the decision circuit can be timed in such a way that it directly follows the signal indicating the testing position of the identification card. If the contact surfaces are to be cleaned at several predetermined intervals, the interrogation is to be repeated accordingly, for example, initiated by the stop-signal of the motor 8.

Although FIG. 9 shows a simplified, exemplary form of execution of the latter test method, it is clear that the proper processing of logical levels, among other things, is also monitored along with the contact testing, since components of the integrated circuit are taken into consideration in the test.

More complex test methods which also take the circuit itself into consideration in the test, are within the scope of the general idea of the invention.

What is claimed is:

1. A method for establishing an electrical connection suitable for communicating a data signal between contact elements in a receiving station and contact areas provided on the surface of a member placed in the receiving station in proximity with the contact elements, said method comprising the steps of:
applying the contact elements to the contact areas for purposes of establishing an electrical connection suitable for communicating the data signal between the contact elements and contact areas;
thereafter retaining the contact elements at the points of initial application to the contact areas irrespective of whether the electrical connection exists or not;

initiating a test employing electrical phenomena associated with a signal other than the data signal for determining whether an electrical connection suitable for communicating the data signal exists between the contact elements and contact areas at the points of application of the contact elements;

determining by means of said other signal phenomena whether a suitable electrical connection for communicating the data signal exists at said points;

initiating a cleaning of the contact areas at said points if a suitable electrical connection does not exist, while simultaneously carrying out further testing for the existence of a suitable electrical connection;

terminating the cleaning of the contact areas when the existence of a suitable electrical connection between the contact elements and the contact areas is detected by means of said electrical phenomena associated with said other signal; and commencing communication of the data signal between the contact elements and contact areas at the points of initial application of the contact elements to the contact areas when a suitable electrical connection exists.

2. The method of claim 1 further defined as removing the contact elements from the contact areas when said further testing indicates that a suitable electrical connection cannot be established.

3. The method of claim 1 wherein the testing is further defined as measuring electrical properties associated with the contact areas by means of said other electrical signal.

4. The method of claim 3 wherein the testing is further defined as measuring the contact area resistance and comparing same to a threshold value.

5. The method as in claim 3 wherein the testing is further defined as measuring the short circuit current between two contact elements connected with a contact area and comparing the short circuit current with a threshold value.

6. The method as in claim 3 further defined as measuring the shunt resistance between two contact areas and comparing same to a threshold value.

7. The method as in claim 4 further defined as additionally measuring the shunt resistance between two contact areas and comparing same to a threshold value.

8. The method of claim 7 wherein the testing is further defined as measuring the entire resistance between contact areas and comparing same with a threshold value.

9. The method of claim 6 further defined as removing the shunts between contact areas by brush-like elements associated with the contact elements of the receiving station.

* * * * *